United States Patent [19]
Collins

[11] Patent Number: 6,073,763
[45] Date of Patent: *Jun. 13, 2000

[54] HOLDER FOR COMPACT DISC AND THE LIKE

[76] Inventor: William Collins, 30 Durham Rd., New Hyde Park, N.Y. 00040

[*] Notice: This patent is subject to a terminal disclaimer.

[21] Appl. No.: 09/264,326

[22] Filed: Mar. 8, 1999

Related U.S. Application Data

[63] Continuation-in-part of application No. 09/289,834, Nov. 24, 1998, which is a continuation-in-part of application No. 09/034,135, Feb. 27, 1998, Pat. No. 5,957,281, which is a continuation-in-part of application No. 08/576,497, Dec. 21, 1995, Pat. No. 5,749,463, and application No. 08/607,647, Feb. 27, 1996, Pat. No. 5,769,216.

[51] Int. Cl.$^7$ .................................................. B65D 85/57
[52] U.S. Cl. .................................... 206/308.1; 206/308.3; 206/313
[58] Field of Search ............................ 206/308.1, 308.3, 206/309, 312, 313

[56] References Cited

U.S. PATENT DOCUMENTS

| | | |
|---|---|---|
| 774,037 | 11/1904 | Bürgi . |
| 2,189,076 | 2/1940 | Liskin . |
| 2,471,173 | 5/1949 | Taylor . |
| 2,827,223 | 3/1958 | Allison . |
| 3,112,858 | 12/1963 | Ullger . |
| 3,245,691 | 4/1966 | Gorman . |
| 3,301,467 | 1/1967 | Shore ..................................... 206/312 |
| 3,595,383 | 7/1971 | Boylan . |
| 4,488,645 | 12/1984 | Yamaguchi . |
| 4,566,590 | 1/1986 | Manning et al. . |
| 4,653,639 | 3/1987 | Traynor . |
| 4,805,770 | 2/1989 | Grobecker et al. . |
| 4,850,731 | 7/1989 | Youngs . |
| 5,048,681 | 9/1991 | Henkel . |
| 5,085,318 | 2/1992 | Leverick . |
| 5,101,983 | 4/1992 | Martinez . |
| 5,147,036 | 9/1992 | Jacobs . |
| 5,154,284 | 10/1992 | Starkey . |
| 5,188,229 | 2/1993 | Bernstein . |
| 5,207,717 | 5/1993 | Manning . |
| 5,248,032 | 9/1993 | Sheu et al. . |
| 5,255,785 | 10/1993 | Mackey . |
| 5,289,918 | 3/1994 | Dobias et al. . |
| 5,291,990 | 3/1994 | Sejzer . |
| 5,333,728 | 8/1994 | O'Brien et al. . |
| 5,396,987 | 3/1995 | Temple et al. . |
| 5,419,433 | 5/1995 | Harrer et al. . |
| 5,422,875 | 6/1995 | Bribach . |
| 5,460,265 | 10/1995 | Kiolbasa . |
| 5,506,740 | 4/1996 | Harmon . |
| 5,600,628 | 2/1997 | Spector ............................ 206/308.1 X |
| 5,749,463 | 5/1998 | Collins ................................ 206/308.1 |
| 5,769,216 | 6/1998 | Collins ................................ 206/308.1 |

FOREIGN PATENT DOCUMENTS

| | | |
|---|---|---|
| 5213387 | 8/1993 | Japan . |
| 8702565 | 5/1989 | Netherlands . |
| 94/22742 | 10/1994 | WIPO . |

*Primary Examiner*—Bryon P. Gehman
*Attorney, Agent, or Firm*—Frishauf, Holtz, Goodman, Langer & Chick, P.C.

[57] ABSTRACT

A disc holder for retaining a disc, includes a rear planar panel with the front surface for supporting a disc thereon, and first and second side retention sections secured in overlying relation with respect to the front surface of the rear panel adjacent opposite edges thereof, each side retention section including first and second panel sections, with the first panel section connected at one edge to one side edge of the rear panel along a fold line, and the second panel section connected at one edge to an opposite edge of the respective first panel section along a further fold line, with the first and second panel sections of each side retention section overlying one another, each second panel section adhesively secured on the rear panel, each side retention section having a cut-out portion which defines a curved edge that substantially corresponds to at least a portion of the disc edge, and each side retention section having a height greater than a thickness of the compact disc held in the holder, with the curved edges of the two side retention sections being spaced apart by a distance at all positions thereon which is greater than a radius of the disc so as not to overlie the disc, while effectively preventing lateral sliding movement of the disc.

10 Claims, 4 Drawing Sheets

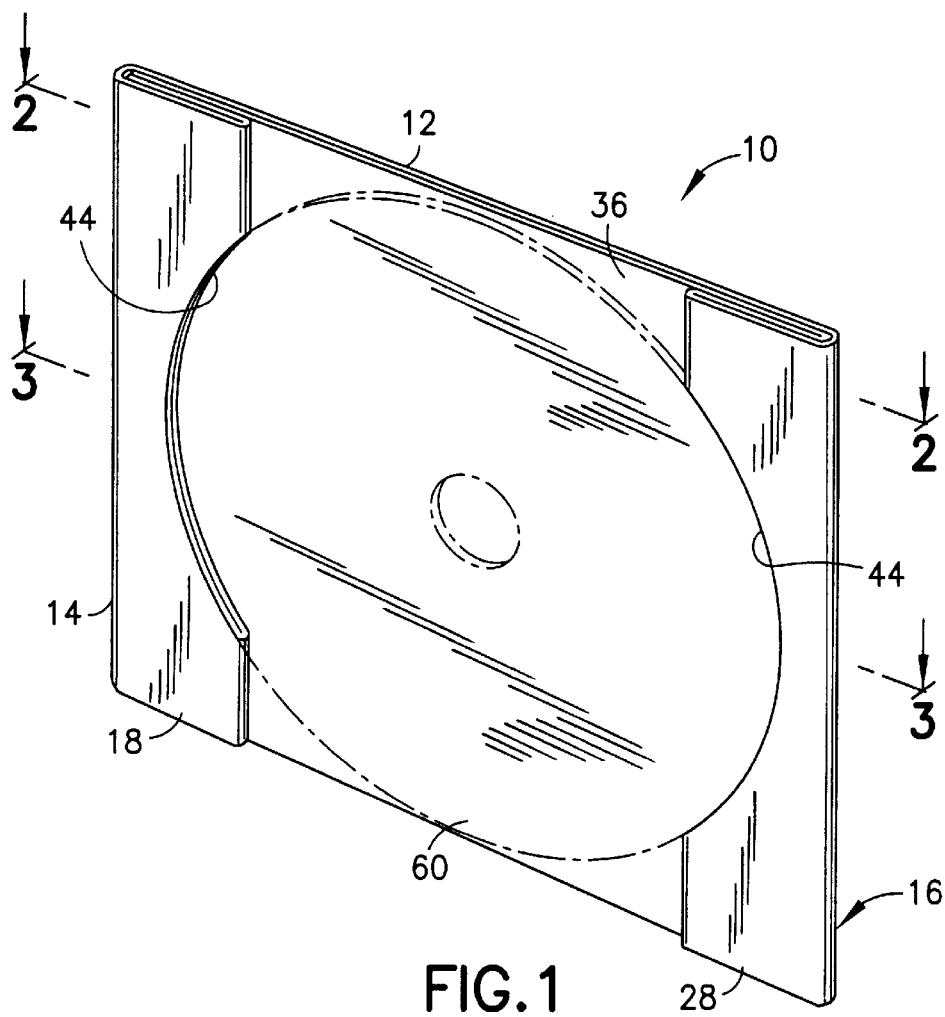
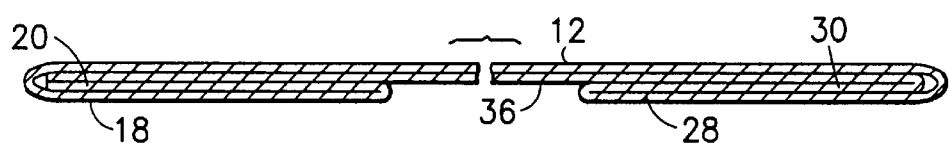
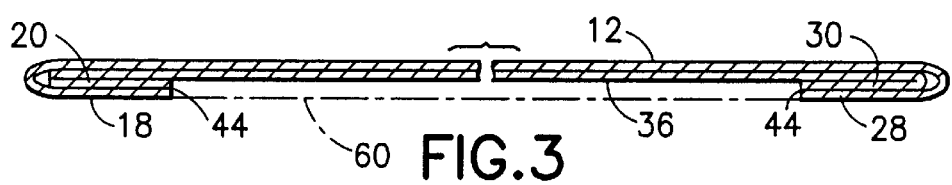

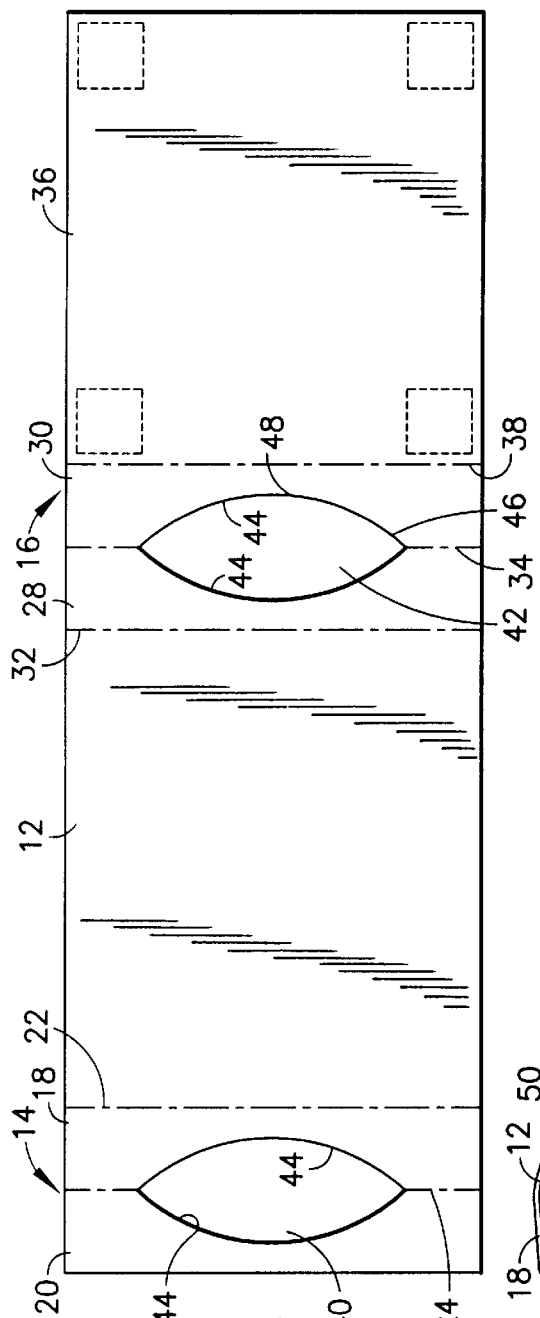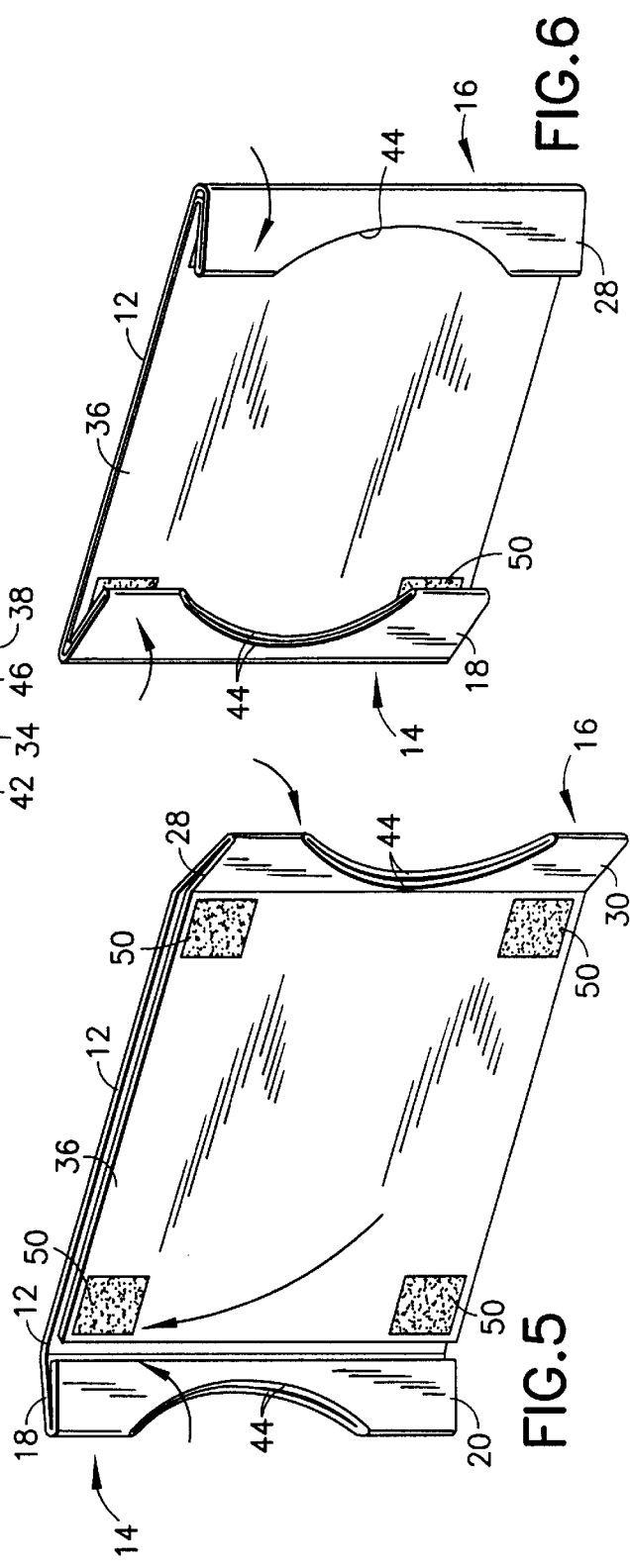

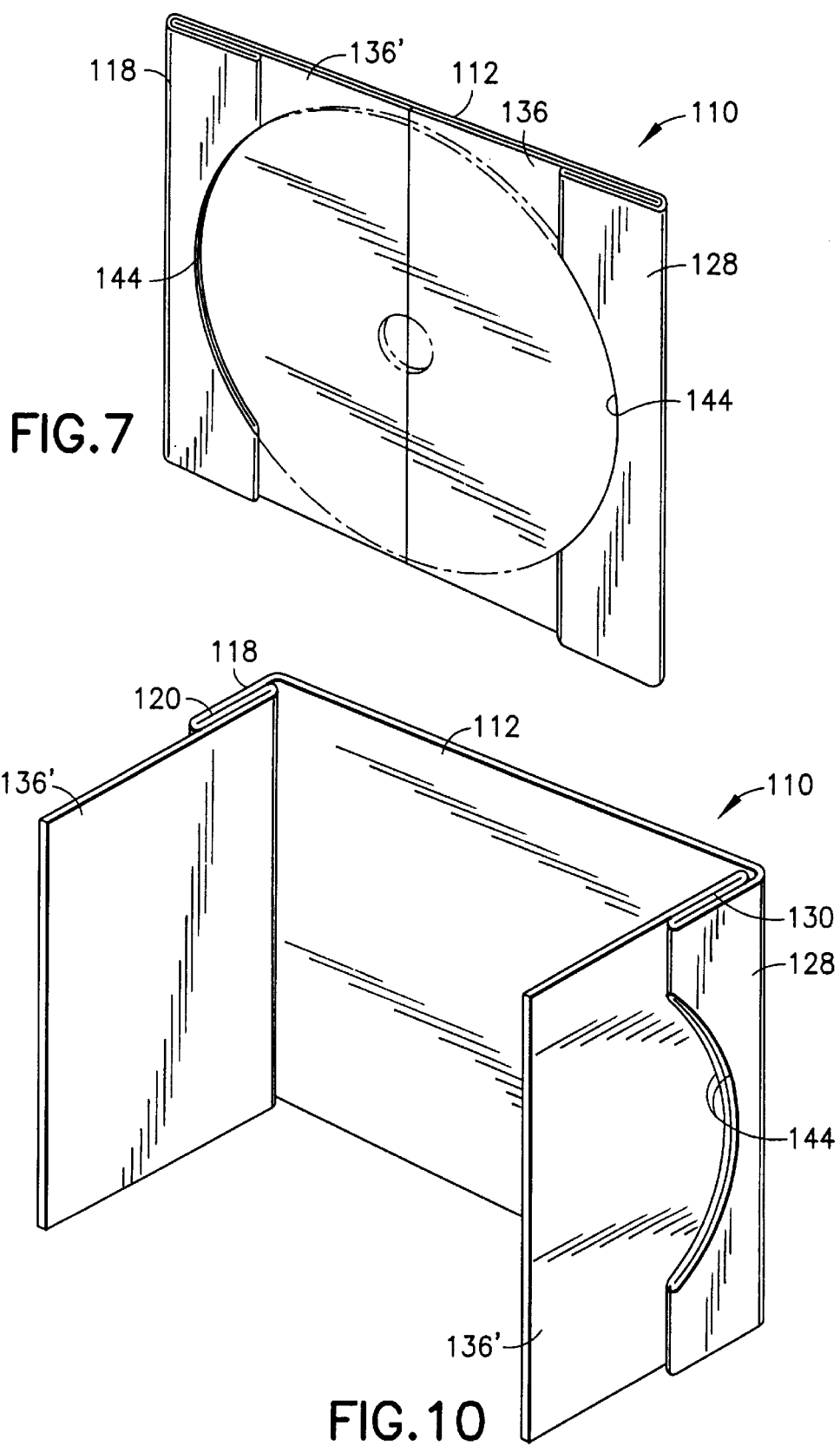

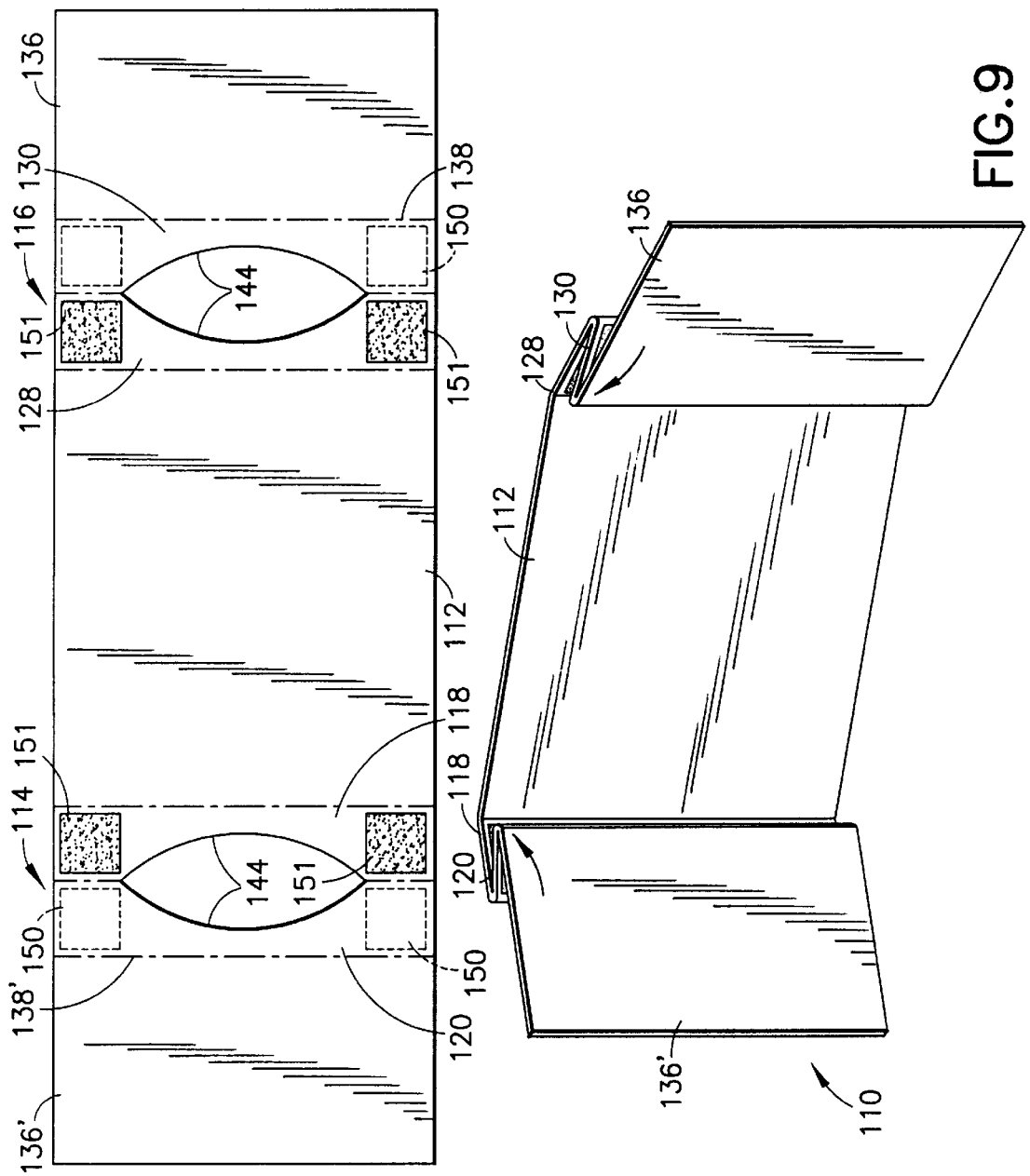

HOLDER FOR COMPACT DISC AND THE LIKE

CROSS REFERENCE TO RELATED APPLICATIONS

The present application is a Continuation-In-Part (CIP) of U.S. patent application Ser. No. 09/289,834 pending entitled "Holder For Compact Disc And The Like" filed Nov. 24, 1998 by the inventor of the present application (Attorney Docket No. 950114CIP2/LH), and a CIP of U.S. patent application Ser. No. 09/034,135 filed Feb. 27, 1998 (now U.S. Pat. No. 5,957,281), which is a CIP of U.S. patent application Ser. Nos. 08/576,497 filed Dec. 21, 1995 (now U.S. Pat. No. 5,749,463) and 08/607,647 filed Feb. 27, 1996 (now U.S. Pat. No. 5,769,216), the disclosure of each of which is incorporated herein by reference.

BACKGROUND OF THE INVENTION

1. Field of the Invention

The present invention relates to a holder for securely storing and transporting a compact disc, computer floppy disc and the like, for permitting the rapid insertion and removal of the disc, and for fully displaying substantially the entire face of the disc label when the disc is retained in the holder.

2. Background Information

Devices for retaining a compact disc or a computer floppy disc have traditionally been constructed at least partially of plastic, or to include paperboard sleeves which obscure all or a significant portion of the disc label. These conventional compact disc holders have the drawback of not being capable of being manufactured substantially entirely by a machine.

U.S. Pat. No. 5,749,463 to Collins, the entire disclosure of which is incorporated herein by reference, discloses a compact disc holder made of cardboard in which there is a rear panel and side retention sections, such that the compact disc is held on the rear panel by the side retention sections. The retention sections, however, are relatively complex, and must be provided with either splines and/or more than three layers of material in order for the retention sections to extend higher than the compact disc. In such case, portions of the retention sections which extend higher than the compact disc extend inwardly over the face of the compact disc to hold down the compact disc on the rear panel. In addition, this holder requires a lid that covers the front surface of the compact disc. Due to this arrangement, the holder is complex and has a relatively high cost because of the amount of material that must be used and the complexity of manufacturing the same.

U.S. Pat. No. 5,769,216 to Collins, the entire disclosure of which is incorporated herein by reference, discloses a compact disc holder made of cardboard in which there is a rear panel and retention sections, such that the compact disc is held on the rear panel by the side retention sections. The retention sections include corner sections that have arcuate edges which engage the compact disc to prevent sliding thereof. The corner sections, however, are made of a single layer of material and have heights less than the height of a compact disc, as clearly shown in FIG. 3 thereof. In order to prevent escape of the compact disc, retainment tabs must be provided, so as to hold down the compact disc on the rear panel. This, of course, increases the complexity of the holder, while also increasing the cost of the holder due to the extra material that must be used and the complexity of manufacturing the same.

In a mass mailing that is conventionally performed, for example, by internet service providers such as America Online and Compuserve, it is desirable to provide a compact disc to a consumer which includes packaging having a greatly reduced cost, while protecting the disc from the harsh treatment during handling by the postal service. The above holders, because of their complexity and cost, become inefficient for this purpose.

OBJECTS AND SUMMARY OF THE INVENTION

Accordingly, it is an object of the present invention to provide a compact disc holder that overcomes the problems with the aforementioned prior art.

It is another object of the present invention to provide a compact disc holder which can be made of paperboard or similar materials using conventional folding equipment, such as that used in carton making.

It is still another object of the invention to produce an economical compact disc holder capable of housing a compact disc for storage and/or mailing.

It is yet another object of the invention to provide a compact disc holder wherein the compact disc is easily inserted and removed therefrom, and which can be economically manufactured.

In accordance with the present invention, a disc holder for retaining a disc having an edge defining a radius of curvature, includes a rear planar panel having opposite first and second surfaces, the first surface of the rear panel supporting a disc thereon when the disc is inserted within the disc holder. A first side retention section is secured in overlying relation with respect to the first surface of the rear panel adjacent one edge thereof, the first side retention section having a first cut-out portion which defines a first curved edge that substantially corresponds to at least a portion of the disc edge. Also, a second side retention section is secured in overlying relation with respect to the first surface of the rear panel adjacent an opposite edge thereof, the second side retention section having a second cut-out portion which defines a second curved edge that substantially corresponds to at least a portion of the disc edge. The first and second curved edges are spaced apart by a distance at all positions thereon which is greater than a radius of the disc so as not to overlie the disc, while effectively preventing lateral sliding movement of the disc.

The side retention sections are contiguous with and connected to opposite side edges of the rear panel at respective fold lines. Each side retention section includes two panel sections, with a first one of the panel sections having a first side edge connected to one side edge of the rear panel along one fold line, and a second one of the panel sections having a first side edge connected to an opposite second edge of the first panel section along a further fold line. In such case, the first and second panel sections of each side retention section overlie one another.

Also, the first and second panel sections of the first side retention section have cut-out portions in superposed relation that define the first curved edge, and the first and second panel sections of the second side retention section have cut-out portions in superposed relation that define the second curved edge.

The second panel section of each side retention section is connected with the rear panel adjacent a respective edge thereof. Preferably, adhesive is provided for securing the second panel section of each side retention section with the rear panel adjacent a respective edge thereof.

In one embodiment, the second side retention section includes a third panel section having a first side edge connected to an opposite second edge of the second panel section of the second side retention section, along a further fold line. In such case, the third panel section is secured to the first surface of the rear panel, and the second panel sections of the first and second side retention sections are connected to the third panel section, and thereby to the rear panel.

Preferably, adhesive is provided for securing the third panel section to the first surface of the rear panel, and for securing the second panel sections of the first and second side retention sections to the third panel section.

The first and second side retention sections preferably have a height greater than a thickness of the compact disc held in the holder.

In another embodiment, each side retention section includes a third panel section having a first side edge connected to an opposite second edge of the second panel section thereof along a further fold line, and the third panel section is secured to the first surface of the rear panel. In such case, the second panel section of the first side retention section is connected to the third panel section of the first side retention section, and thereby to the rear panel, and the second panel section of the second side retention section is connected to the third panel section of the second side retention section, and thereby to the rear panel. Preferably, again, adhesive is provided for securing each third panel section to the first surface of the rear panel, and for securing the second panel sections of the first and second side retention sections to the third panel sections of the first and second side retention sections, respectively.

The above and other objects, features and advantages of the present invention will become readily apparent from the following detailed description thereof which is to be read in connection with the accompanying drawings.

BRIEF DESCRIPTION OF THE DRAWINGS

FIG. 1 is a perspective view of a compact disc holder according to a first embodiment of the present invention, shown in its folded, assembled condition and having a compact disk shown in phantom therein;

FIG. 2 is a cross-sectional view of FIG. 1, taken along line 2—2;

FIG. 3 is a cross-sectional view of FIG. 1, taken along line 3—3;

FIG. 4 is an unassembled plan view showing an unfolded blank from which the compact disc holder of FIG. 1 may be constructed;

FIG. 5 is a perspective view of the blank of FIG. 2 in a first, partially folded condition;

FIG. 6 is a perspective view of the blank of FIG. 2 in a second, partially folded condition;

FIG. 7 is a perspective view of a compact disc holder of a second embodiment of the present invention shown in its folded, assembled condition and having a compact disk shown in phantom, secured therein;

FIG. 8 is an unassembled plan view showing an unfolded blank from which the compact disc holder of FIG. 6 may be constructed;

FIG. 9 is a perspective view of the blank of FIG. 8 in a first, partially folded condition; and FIG. 10 is a perspective view of the blank of FIG. 8 in a second, partially folded condition.

DETAILED DESCRIPTION OF THE PREFERRED EMBODIMENT

Referring now to the drawings, FIG. 1 shows a perspective view of a compact disc holder 10 according to a first embodiment of the present invention. Disc holder 10 is preferably made of paperboard or other similar materials that can be worked and formed on a conventional carton making machine.

Throughout the following description, the term compact disc (CD) is generally used. However, it should be clear that the invention is equally applicable to other discs, such as computer floppy discs, and the like. The description with respect to "compact discs" should not be deemed to be limiting of the present invention. In the claims, the more general term "disc" is used to encompass not only compact discs, but any disc.

Disc holder 10 includes a rectangular rear panel 12 having folded side retention sections 14 and 16 at each side edge thereof. Each folded side retention section 14 and 16 includes a plurality of panel portions having score or fold lines therebetween, such that the side retention sections 14 and 16 extend to a height at least equal to, and preferably greater than the thickness of a compact disc, but which do not cover or overlap the face of the compact disc.

Disc holder 10 can be formed from a blank, as shown in FIG. 4, by a stamping or cutting process wherein the entire paperboard layout which forms the holder is cut during a single machine operation. Specifically, folded side retention section 14 extends to the left of rear panel 12 and includes two panel sections 18 and 20. Each panel section 18 and 20 preferably has the same thickness as rear panel 12, but has a greatly reduced width, for example, about 10–20% the width of rear panel 12. Preferably, panel section 20 has a slightly lesser width than panel section 18. A fold or score line 22 is formed between the left side edge of rear panel 12 and panel section 18, and a fold or score line 24 is formed between panel sections 18 and 20, with fold or score lines 22 and 24 being parallel to each other.

Folded side retention section 16 is similarly constructed. Thus, folded side retention section 16 extends from the right side edge of rear panel 12 and includes three panel sections 28, 30 and 36. Panel sections 28 and 30 have the same thickness as rear panel 12, but have a greatly reduced width, for example, about 10–20% the width of rear panel 12. Preferably, panel section 30 has a slightly lesser width than panel section 28. A fold or score line 32 is formed between the right side edge of rear panel 12 and panel section 28, and a fold or score line 34 is formed between panel sections 28 and 30, with fold or score lines 32 and 34 being parallel to each other.

Panel section 36 is formed as a rectangular panel with similar dimensions to rear panel 12, and at the right edge of panel section 30, with a fold or score line 38 formed between panel section 30 and rectangular panel section 36.

Substantially oval-shaped cut-out portions 40 and 42 are formed between panel sections 18 and 20, and between panel sections 28 and 30, respectively. The edges 44 of cut-out portions 40 and 42 are curved for retaining a compact disc 60 in the assembled holder. Specifically, cut-out portions 40 and 42 form generally oval-type openings that define generally part-circular or slightly elliptical curved edges 44 that generally mirror each other. The radius of curvature of curved edges 44 can conform to that of the outer periphery of a compact disc so that the entire edges 44 are used to restrain lateral movement of the compact disc, or can be of a slightly elliptical configuration so that only the upper and lower portions of the curved edges 44 are used to restrain the compact disc. The arc-like cut-out portions 40 and 42 are removed such that the peripheral edge of a compact disc will be restrained on rear panel 12 by curved edges 44. The arc-like cut-out portions 40 and 42 are preferably removed, and the curved edges 44 correspondingly formed, using the aforementioned conventional cardboard carton making machinery.

When disc holder 10 is constructed as shown in FIG. 1, folded side retention sections 14 and 16 are formed by folding, each in the manner shown in FIGS. 5 and 6, along the fold or score lines 22, 24, 32, 34 and 38 of FIG. 4. In this manner, panel sections 18, 20, 28, 30 and 36 are folded on each other to form folded side retention sections 14 and 16.

Specifically, panel section 30 is first folded forwardly about fold line 34 as indicated by arrows A1 and A2 in FIG. 5 onto the front surface of panel section 28, such that curved edges 44 of cut-out portion 42 are superposed over each other. In this condition, panel section 36 is positioned in superposed relation on top of rear panel 12, and is adhered thereto by adhesive (not shown). Further, in this condition, fold lines 32 and 38 are superposed over each other. Small areas of adhesive 50 are then applied to top and bottom portions at the rear surface of panel section 36, adjacent fold lines 32 and 38. Then, superimposed panel sections 28 and 30 are folded along fold lines 32 and 38 as indicated by arrow A3 in FIG. 6. As a result, top and bottom portions at the rear surface of panel section 30 are adhered to panel section 36, and thereby effectively to rear panel 12 thereat, so as to form side retention section 16. It will be appreciated that curved edges 44 of cut-out portion 42 are superposed over each other in this position. Adhesive 50 is of sufficient strength to maintain folded side retention sections 14 and 16 in this secured condition. Although adhesive 50 is shown only at two spots 50 of panel section 36, adjacent each side edge of rear panel 12, adhesive 50 can be applied along the entire side edges thereof. In lieu of an adhesive, other forms of fastening may be employed such as stapling or engagable hook and loop material. However, adhesive is the preferred method of securement due to its relative ease of application and low cost.

At the opposite side of rear panel 12, panel section 20 is then folded forwardly along fold line 24 as indicated by arrow B1 in FIG. 5 over panel section 18 so as to be superposed thereon, and such that curved edges 44 of cut-out portion 40 are superposed over each other. Small areas of adhesive 50 are then applied to top and bottom portions of the rear surface of panel section 36, adjacent fold line 22. Then, panel section 18 is folded about fold line 22 as indicated by arrow B2 in FIG. 6. As a result, top and bottom portions at the rear surface of panel section 20 are adhered to panel section 36, and thereby effectively to rear panel 12 thereat, so as to form side retention section 14.

Thus, side retention sections 14 and 16 project out of the plane that defines the upper surface of rear panel 12, so as to form outer limiting walls for restraining lateral movement of the compact disc on rear panel 12.

In operation, a compact disc is placed on rear panel and is restrained from any lateral movement thereon by side retention sections 14 and 16, and particularly, curved edges 44 thereof. However, curved edges 44 are spaced apart by a distance at all positions thereon which is greater than the diameter of the compact disc so as not to overlie the compact disc, while effectively preventing lateral sliding movement of the compact disc on rear panel 12. In other words, unlike the aforementioned prior art references, side retention sections 14 and 16 do not overlap and lie over the face of the compact disc to retain the compact disc in position. Rather, side retention sections merely restrain lateral movement of the compact disc, and for this reason, have a height at least that, and preferably greater than the thickness of a compact disc. Further, because there are only two side retention assemblies, the construction is much simpler than the arrangement of U.S. Pat. No. 5,769,216 which uses four corner assemblies as well as retaining tabs.

Because of the simple arrangement of the present invention, there is less material that is used and the structure is less complex than the aforementioned prior art. After the compact disc is placed therein, the entire assembly can be shrink-wrapped to prevent removal of the compact disc. This has the advantage that a relatively simple constructed package can be provided for mailing or the like.

Referring now to FIGS. 7–10, an alternative embodiment of a compact disc holder 110 of the present invention will now be described, in which common elements use the same reference numeral, but are augmented by 100. The modified disc holder 110 is substantially the same as the disc holder 10 of FIGS. 1–6, expect that panel section 136 is one-half the width of panel section 36. At the same time, a further panel section 136' of the same dimensions as panel section 136, is formed as a rectangular panel at the left edge of panel section 120, with a fold or score line 138' formed between panel section 120 and rectangular panel section 136'. Left side retention section 114 and right side retention section 116 are then folded over in the same manner as right side retention section 16 of FIGS. 1–6, with the outer edges of panel sections 136 and 136' meeting at the center of rear panel 112.

Further, adhesive areas 150 corresponding to adhesive areas 50, are formed on the rear surfaces of panel sections 120 and 130, rather than on panel sections 136 and 136' to provide the same effect. In addition, adhesive areas 151 are provided on the front surfaces of panel sections 118 and 128 in order to adhesively secure panel sections 118 and 120 together, and panel sections 128 and 130 together.

It will be appreciated that various modifications can be made to the present invention, within the scope of the claims herein. For example, although panel sections 36, 136, 136' provide greater structural integrity to the holder by effectively increasing the thickness of rear panels 12 and 112 against which the compact disc lies, and by further anchoring folded side retention sections 14, 16 and 114, 116, such panel sections can be eliminated. In such case, the folded side retention sections would be adhered directly to rear panel 12, rather than indirectly to rear panel 12 through panel sections 36, 136 and 136'. In addition, panel sections 136, 136' can be secured to rear panel section 112 only at a bottom portion thereof so that printed matter can be inserted between panels 112 and 136, 136'. It is also foreseen that the paperboard from which the holder is constructed may have writings or indicia thereon which may be applied before, during or after the paperboard blank is cut. Moreover, a cover panel which extends over the face of the compact disc and which is coupled at an edge to the rear retention panel may be included to add an additional level of protection to the compact disc.

Although illustrative embodiments of the present invention have been described herein with reference to the accompanying drawings, it is to be understood that the present invention is not limited to those precise embodiments, and that various other changes and modifications may be effected therein by one skilled in the art without departing from the scope or spirit of the invention as defined by the appended claims.

What is claimed is:

1. A disc holder for retaining a disc having an edge defining a radius of curvature, comprising:

a rear planar panel having opposite first and second surfaces, the first surface of said rear panel supporting the disc thereon when the disc is inserted within said disc holder;

a first side retention section secured in overlying relation with respect to the first surface of the rear panel adjacent a first edge thereof, said first side retention section having a first cut-out portion which defines a first curved edge that substantially corresponds to at least a portion of the disc edge;

a second side retention section secured in overlying relation with respect to the first surface of the rear panel adjacent a second edge thereof, said second side retention section having a second cut-out portion which defines a second curved edge that substantially corresponds to at least a portion of the disc edge;

wherein said first and second curved edges being spaced apart by a distance at all positions thereon which is greater than a diameter of the disc so as not to overlie the disc, while effectively preventing lateral movement of the disc, and wherein each of the first and second side retention sections includes first and second panel sections, said first and second panel sections of said first side retention section having cut-out portions in superposed relation that define said first curved edge, and said first and second panel sections of said second side retention section having cut-out portions in superposed relation that define said second curved edge.

2. The disc holder as defined by claim 1, wherein the first and second side retention sections are contiguous with and connected to opposite side edges of the rear panel at respective fold lines.

3. The disc holder as defined by claim 2, wherein said first panel section having a first side edge connected to one side edge of said rear panel along one said fold line, and said second panel section having a first side edge connected to a second edge of said first panel section along a further fold line, and said first and second panel sections of each side retention section overlying one another.

4. The disc holder as defined by claim 1, wherein said second panel section of each said side retention section is connected with the rear panel adjacent a respective edge of the corresponding side retention section.

5. The disc holder as defined by claim 4, further comprising adhesive for securing said second panel section of each said side retention section with the rear panel adjacent a respective edge of the corresponding side retention section.

6. The disc holder as defined by claim 1, wherein said first and second side retention sections have heights greater than a thickness of the compact disc held in the holder.

7. A disc holder for retaining a disc having an edge defining a radius of curvature, comprising:

a rear planar panel having opposite first and second surfaces, the first surface of said rear panel supporting the disc thereon when the disc is inserted within said disc holder;

a first side retention section secured in overlying relation with respect to the first surface of the rear panel adjacent a first edge thereof, said first side retention section having a first cut-out portion which defines a first curved edge that substantially corresponds to at least a portion of the disc edge;

a second side retention section secured in overlying relation with respect to the first surface of the rear panel adjacent a second edge thereof, said second side retention section having a second cut-out portion which defines a second curved edge that substantially corresponds to at least a portion of the disc edge;

wherein said first and second curved edges being spaced apart by a distance at all positions thereon which is greater than a diameter of the disc so as not to overlie the disc, while effectively preventing lateral movement of the disc, and wherein each of the first and second side retention sections includes first and second panel sections, said second side retention section includes a third panel section having a first side edge connected to an opposite second edge of said second panel section of said second side retention section, along a further fold line, and said third panel section is secured to the first surface of said rear panel, and said second panel sections of said first and second side retention sections are connected to said third panel section, and thereby to said rear panel.

8. The disc holder as defined by claim 7, further comprising adhesive for securing said third panel section to the first surface of the rear panel, and for securing said second panel sections of said first and second side retention sections to said third panel section.

9. A disc holder for retaining a disc having an edge defining a radius of curvature, comprising:

a rear planar panel having opposite first and second surfaces, the first surface of said rear panel supporting the disc thereon when the disc is inserted within said disc holder;

a first side retention section secured in overlying relation with respect to the first surface of the rear panel adjacent a first edge thereof, said first side retention section having a first cut-out portion which defines a first curved edge that substantially corresponds to at least a portion of the disc edge;

a second side retention section secured in overlying relation with respect to the first surface of the rear panel adjacent a second edge thereof, said second side retention section having a second cut-out portion which defines a second curved edge that substantially corresponds to at least a portion of the disc edge;

wherein said first and second curved edges being spaced apart by a distance at all positions thereon which is greater than a diameter of the disc so as not to overlie the disc, while effectively preventing lateral movement of the disc, and wherein each of the first and second side retention sections includes first and second panel sections, wherein each said side retention section includes a third panel section having a first side edge connected to an opposite second edge of said second panel section thereof along a further fold line, and said third panel section is secured to the first surface of said rear panel, wherein said second panel section of said first side retention section is connected to said third panel section of said first side retention section, and thereby to said rear panel, and wherein said second panel section of said second side retention section is connected to said third panel section of said second side retention section, and thereby to said rear panel.

10. The disc holder as defined by claim 9, further comprising adhesive for securing each said third panel section to the first surface of the rear panel, and for securing said second panel sections of said first and second side retention sections to said third panel sections of said first and second side retention sections, respectively.

* * * * *